United States Patent [19]

Shurman et al.

[11] Patent Number: 5,007,234
[45] Date of Patent: Apr. 16, 1991

[54] AUTOMATIC SELF-GUIDING LAWN MOWER AND MOWING METHOD

[76] Inventors: Darlene M. Shurman, 609 16th St., NW.; Gerald L. Shurman, 1221 Cleveland Ave., NW.; Louis W. Shurman, 316 15th St., NW., all of, Canton, Ohio 44703

[21] Appl. No.: 568,221

[22] Filed: Aug. 15, 1990

Related U.S. Application Data

[63] Continuation-in-part of Ser. No. 441,628, Nov. 27, 1989, abandoned.

[51] Int. Cl.$^5$ ............ A01D 34/78; A01D 69/02
[52] U.S. Cl. ............ 56/10.2; 56/16.7; 56/DIG. 2; 56/DIG. 15; 180/131
[58] Field of Search ............ 56/10.2–16.7, 56/DIG. 2, DIG. 3, DIG. 15; 180/131, 167, 79.1, 6.5

[56] References Cited

U.S. PATENT DOCUMENTS

| | | | |
|---|---|---|---|
| 3,425,197 | 2/1969 | Kita | 56/26 |
| 3,548,570 | 12/1970 | Knott et al. | 56/15 |
| 3,583,514 | 6/1971 | Taylor | 180/79 |
| 3,924,389 | 12/1975 | Kita | 56/10.2 |
| 4,184,559 | 1/1980 | Rass | 180/131 |
| 4,513,562 | 4/1985 | Strubbe | 56/10.2 |
| 4,545,453 | 10/1985 | Yoshimura et al. | 180/131 |
| 4,573,547 | 3/1986 | Yoshimura et al. | 180/168 |
| 4,603,753 | 8/1986 | Yoshimura et al. | 180/131 |

OTHER PUBLICATIONS

New Trends–"Self-Steering Mower May Become Commercial Reality".

Primary Examiner—Ramon S. Britts
Assistant Examiner—Terry Lee Melius
Attorney, Agent, or Firm—Michael Sand Co.

[57] ABSTRACT

An automatic self-guiding lawn mower includes a carriage having first and second sets of electric motors mounted thereon. A blade is operatively connected to and driven by each one of the first set of electric motors for cutting grass, and a wheel is operatively connected to and driven by each one of the second set of motors for moving the carriage. A relay device having at least one trip point is electrically connected to each of the first motors and to the second set of motors. The method of mowing a lawn with the improved lawn mower includes the steps of actuating the first set of motors and attached blades and manually cutting a border around the lawn with the mower. The mower then is positioned adjacent to a peripheral edge of an uncut area of the lawn. The relay devices detect a predetermined change in the power consumption of their respective first motors corresponding to the trip point when the attached blades move between cut and uncut grass, and actuate certain ones of the second motors and attached wheels in response thereto for guiding the mower carriage along the peripheral edge of the uncut area of the lawn. The relay devices reverse the polarity of the second motors and the direction of the mower when the blades encounter cut grass for a first predetermined amount of time, and automatically shut off the first and second motors when the blades encounter cut grass for a second predetermined amount of time.

16 Claims, 3 Drawing Sheets

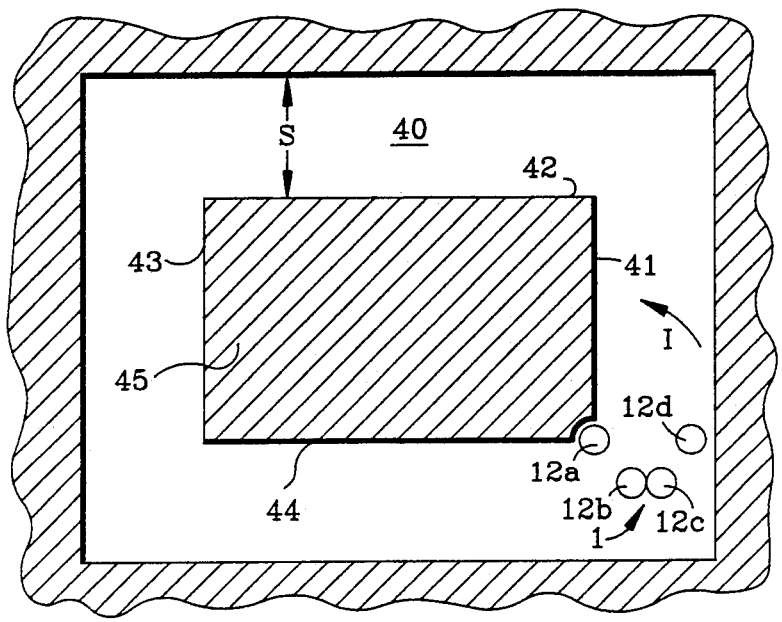
FIG. 2
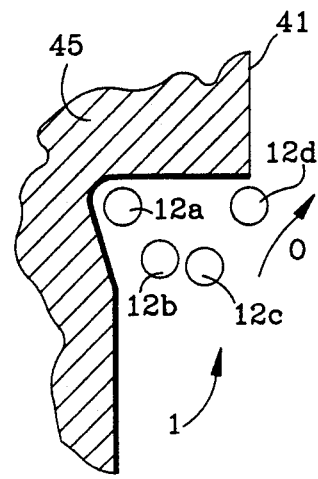
FIG. 5
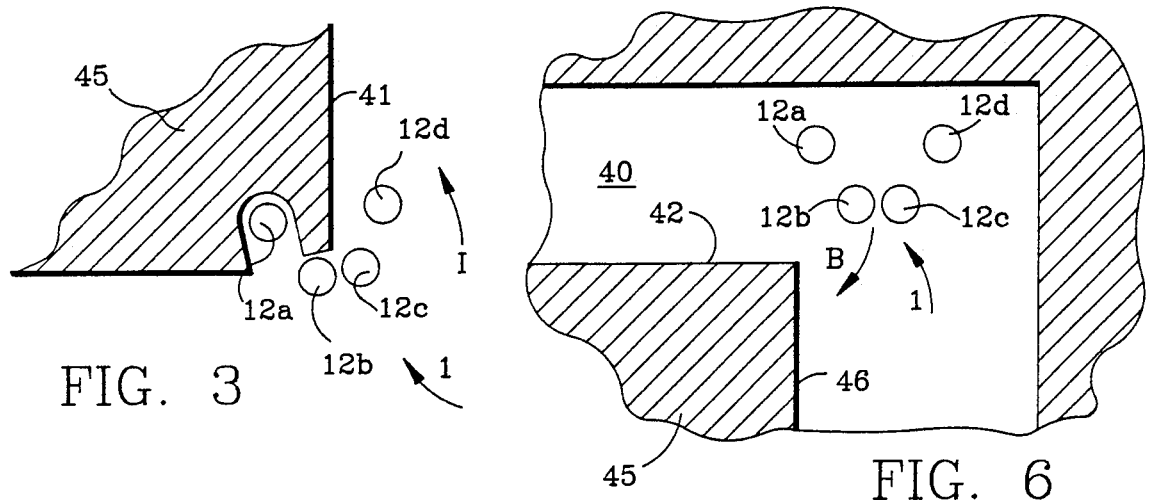
FIG. 3
FIG. 6
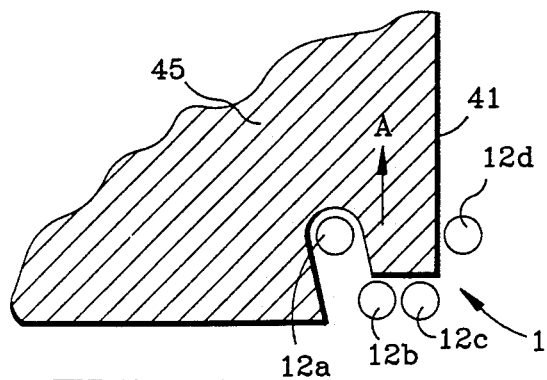
FIG. 4

AUTOMATIC SELF-GUIDING LAWN MOWER AND MOWING METHOD

CROSS REFERENCE TO RELATED APPLICATIONS

The present application is a continuation-in-part of copending application Ser. No. 07/441,628, filed Nov. 27, 1989, now abandoned.

BACKGROUND OF THE INVENTION

1. Technical Field

The invention relates to automatic self-guiding vehicles and in particular to an automatic self-guiding lawn mower and mowing method. More particularly, the invention relates to such an automatic lawn mower which guides itself along a peripheral edge of an area of uncut grass without becoming confused by conditions such as bare spots in the lawn.

2. Background Information

Landscaping is very important to the overall beauty and value of most homes. One of the most important components of the landscaping of many homes is a well-manicured lawn. Large amounts of time, effort and expense are involved in developing and maintaining a nice lawn, and includes such tasks as application of fertilizers and weed and insect killers at regular intervals, watering during dry periods, and mowing. The most tedious of these tasks is mowing. Depending on geographical location and weather trends such as rainfall and temperature, it generally is necessary to mow a lawn on a weekly basis during the growing season, which spans at least six months in most areas of the United States. Depending on the size of a particular lawn and the mowing equipment available, this task can take from minutes to hours.

Technology does exist, over and above usual push mowers having engine-powered cutting blades, to decrease the time it takes to mow a lawn. For example, riding mowers and self-propelled hand mowers can significantly reduce the time and effort involved in mowing a lawn. However, many individuals still do not mow their own lawns for numerous reasons, such as physical disability, lack of time, or laziness. For these individuals, even riding mowers and self-propelled hand mowers often do not provide a satisfactory solution.

Thus, landscape companies offering complete landscape maintenance services including lawn mowing have found a stable niche in our economy. The number of successful landscape companies continues to increase with such increase possibly being attributable to the growing complexity of our society, where people seem to have less time to get things done, including mowing their lawns. However, persons wishing to hire a landscape company can expect to pay from several hundred to a thousand dollars or more just for an annual lawn mowing service, absent any other specialized landscaping services such as a fertilization program, plant maintenance, etc.

Attempts have been made to develop a lawn mower which is advanced over riding mowers and self-propelled hand mowers, and which provides a viable alternative to expensive landscape service companies for those individuals who do not mow their own lawns. The known prior art discloses numerous self-guiding lawn mowers in U.S. Pat. Nos. 3,425,197; 3,924,389; 4,184,559; 4,545,453; 4,573,547; and 4,603,753; and a self-guiding farm tractor in U.S. Pat. No. 3,583,514. However, the equipment disclosed in each of these patents is constructed and operates in a completely different manner than our improved automatic self-guiding lawn mower.

Specifically, our invention utilizes a plurality of cutting blades each driven by a motor having a power consumption sensing device attached thereto, which detects a difference in power consumption by its respective motor depending on whether the attached blade is traveling through cut or uncut grass. These sensors then cause actuation of certain of the various motors which drive the wheels of the mower or reversal of the polarity of the wheel motors and direction of the mower, for directing the mower along a peripheral edge of an area of uncut grass. Trimmer potentiometers also are incorporated into the motor drive circuits to provide fine control and adjustment for the individual motors. In contrast, the prior art apparatus disclosed in the above-listed patents use photosensors coupled with geomagnetic sensors, sensor brushes, sensor blades, or electric current sensors, for guidance. However, some of these guidance systems can be confused causing undesirable results. For example, electric current sensors and sensor brushes can be fooled by bare spots in a lawn.

Other known prior art of interest includes U.S. Pat. No. 3,548,570 which discloses a vehicle-carried, hydraulic powered blade for cutting sugar cane, the height of which is automatically adjusted by a sensor in response to changes in the hydraulic fluid pressure caused by resistance against the blade when it strikes the ground and cane. U.S. Pat. No. 4,513,562 suggests monitoring the loading of a combine harvester for regulating the ground speed thereof which in turn controls the amount of crop being loaded to prevent clogging, by sensing the power consumption of the cutting sickle of the combine. However, the structure, operation and results achieved by our improved lawn mower of the present invention are different than those disclosed in the above patents.

Thus, the need exists for an improved self-guiding lawn mower and mowing method for automatically mowing a lawn without confusion of the mower by conditions such as bare spots in the lawn, grass clippings, etc.

SUMMARY OF THE INVENTION

Objectives of the present invention include providing an improved automatic self-guiding lawn mower and mowing method for mowing a lawn under continuous control to avoid problems of significant confusion of the mower by conditions such as bare spots or depressions in the lawn, grass clippings, weeds, debris, stepping stones, moisture, etc.

Another objective of the invention is to provide such an automatic self-guiding lawn mower and mowing method for mowing a lawn of substantially any shape or size in a relatively short period of time, in daylight or darkness.

A further objective of the invention is to provide such an automatic self-guiding lawn mower and mowing method which are safe, and a mower which is relatively inexpensive to manufacture, and easy and economical to operate and maintain.

A still further objective is to provide trimmer potentiometer for each of the drive motors to provide fine trimming and adjustments therefor.

These objectives and advantages are obtained by the automatic self-guiding lawn mower of the present invention, the general nature of which may be stated as including a carriage, first and second motors mounted on the carriage, blade means operatively connected to and driven by the first motor for cutting a lawn, wheel means operatively connected to and driven by the second motor for moving the carriage, and sensor means connected to the first and second motors for detecting a predetermined change in the operation of the first motor when the blade means moves between a cut area and an uncut area of the lawn, and for causing a certain change in the second motor upon detection of the predetermined change in the first motor, so that the carriage is moved along the uncut area of the lawn.

The objectives and advantages are further obtained by the method of the invention for mowing a lawn with an automatic self-guiding lawn mower having at least first and second motors for driving operatively connected blade means and wheel means, respectively, for cutting the lawn and moving the mower, the general nature of which may be stated as including the steps of, actuating the first motor of the lawn mower for driving the operatively connected blade means, cutting a border around the lawn with the mower, positioning the mower adjacent to a peripheral edge of an uncut area of the lawn, sensing a predetermined change in the operation of the first motor when the attached blade means moves between a cut area and an uncut area of the lawn, and causing a certain change in the second motor upon detection of the predetermined change in the first motor, so that the mower moves along the peripheral edge of the uncut area of the lawn.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 2 is a diagrammatic view showing the self-guiding mower positioned adjacent to a peripheral edge of an uncut area of a lawn which is surrounded by a pre-cut border area, and one of four blades of the mower encountering uncut grass with the resultant turning of the mower into the uncut grass;

FIG. 3 is a diagrammatic view similar to FIG. 2, showing two of the four mower blades encountering uncut grass, and the resultant continued turning of the mower into the uncut grass;

FIG. 4 is a diagrammatic view similar to FIGS. 2-3, showing three of the mower blades encountering uncut grass, and the resultant movement of the mower along the peripheral edge of the uncut area of the lawn;

FIG. 5 is a diagrammatic view similar to FIGS. 2-4, showing all four of the mower blades encountering uncut grass, and the resultant turning of the mower in the direction of cut grass to resume the path shown in FIG. 4; and FIG. 6 is a diagrammatic view similar to FIGS. 2-5, showing all four of the mower blades encountering the cut grass border area which surrounds the lawn area being mowed, and the resultant reversal of direction of the mower.

Similar numerals refer to similar parts throughout the drawings.

DESCRIPTION OF THE PREFERRED EMBODIMENT

Figure 1:
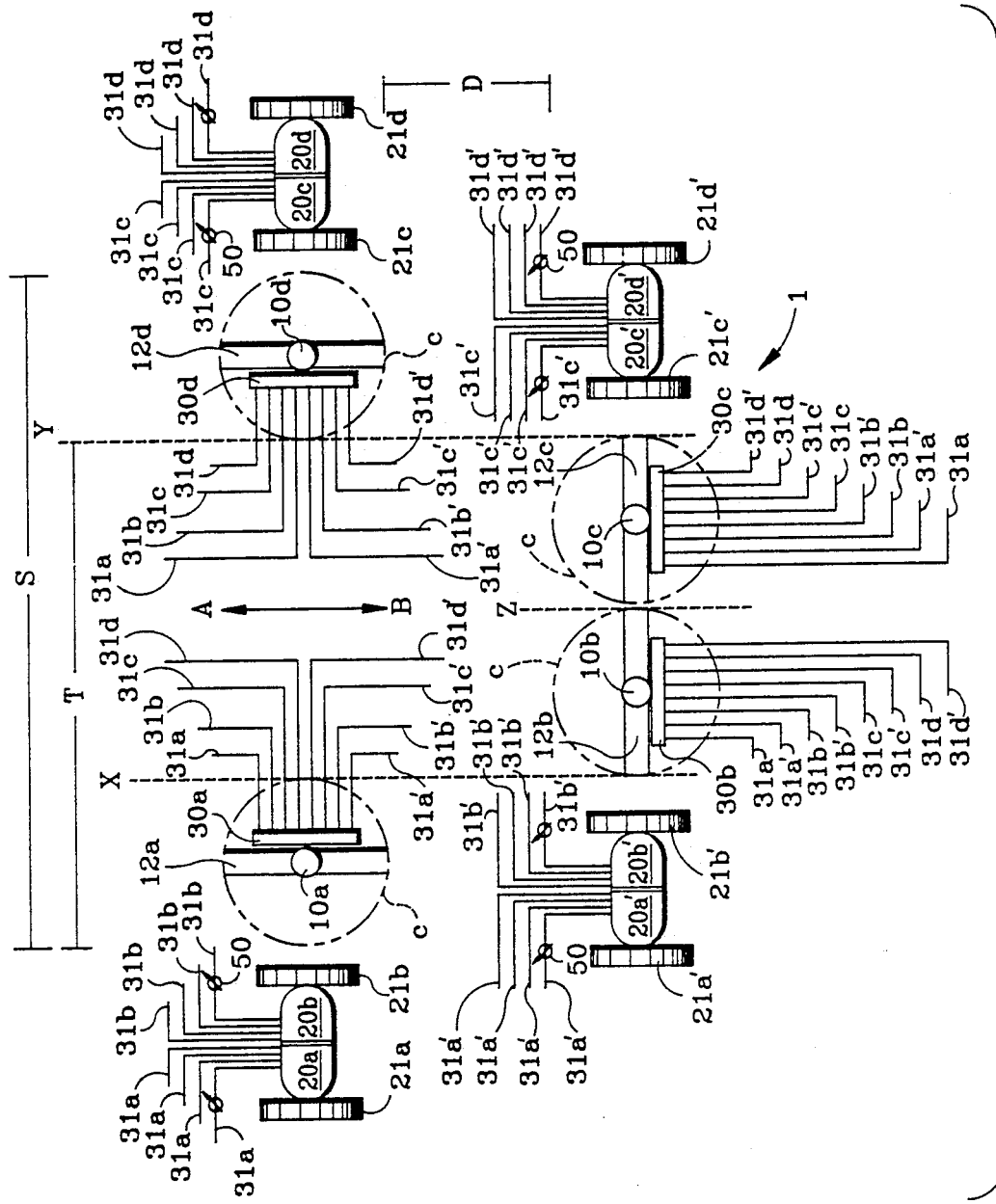
FIG. 1 is a diagrammatic view of the improved automatic self-guiding lawn mower of the present invention.
Figure 1A:
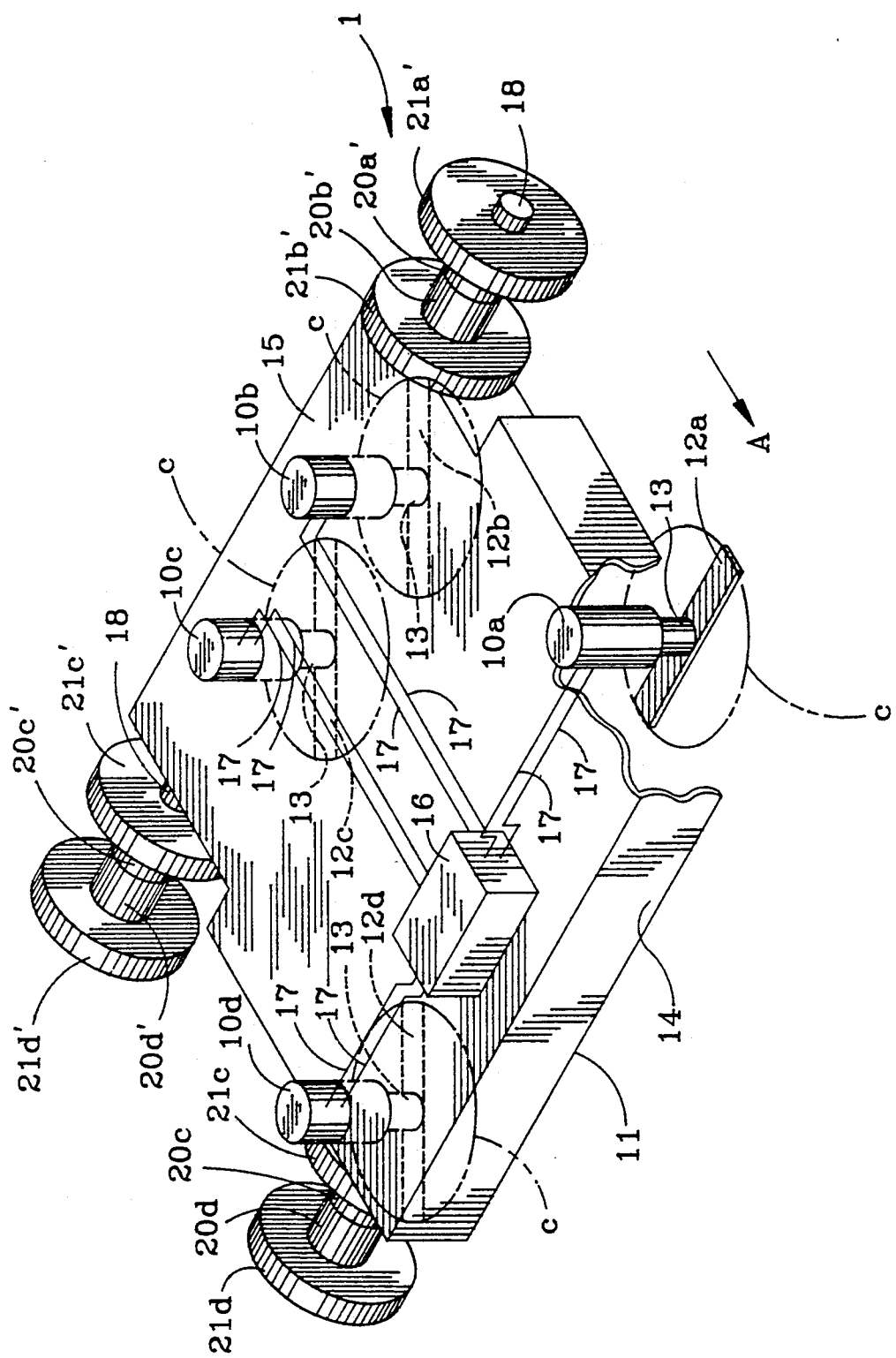
FIG. 1a is a perspective view of the self-guiding lawn mower of the invention, with portions broken away.

The improved automatic self-guiding lawn mower of the present invention is indicated generally at 1, and is shown diagrammatically in FIG. 1 and perspectively in FIG. 1a. Four relatively low power electric motors, hereinafter collectively referred to as 10 and individually as 10a, 10b, 10c and 10d, are mounted on a carriage or deck 11 of a type which is well-known in the lawn mower art. Motors 10 are mounted on carriage 11 so that an output shaft 13 of each of the motors extends downwardly beneath the carriage. Four elongated blades, hereinafter collectively referred to as 12 and individually as 12a, 12b, 12c and 12d, are horizontally mounted on output shafts 13 of motors 10a, 10b, 10c and 10d, respectively, which rotate the ends of each of the blades along a circumferential path C as indicated by phantom lines in FIGS. 1 and 1a, for cutting grass. Motors 10a and 10d are mounted adjacent to a first end 14 of carriage 11 in an aligned, sidewardly spaced relationship, wherein the direction of spacing of the motors is generally perpendicular to the two general directions of movement of mower 1 as indicated by arrows A and B in FIGS. 1 and 1a. The ends of rotating blades 12a and 12d of motors 10a and 10d pass generally tangential to imaginary lines X and Y, respectively. Motors 10b and 10c are mounted adjacent to each other and to a second end 15 of carriage 11, so that the ends of rotating blades 12b and 12c of motors 10b and 10c also pass generally tangential to imaginary lines X and Y, respectively, and additionally pass generally tangential to intermediate imaginary line Z. The ends of rotating blades 12b and 12c are spaced from the ends of rotating blades 12a and 12d by a distance D as shown in FIG. 1. Thus, it can be appreciated that blades 12 have a potential continuous cutting swath or path illustrated by distance S as shown in FIG. 1.

Electric motors 10 preferably are powered by a battery 16 which is electrically connected to the motors by electrical connectors 17 (FIG. 1a). A mobile solar panel alternatively could be used for power if desired. The low power requirements of motors 10 results in extended battery life if a battery 16 is used, and also allows for the solar panel option. However, usual internal combustion engines could be used as yet another alternative, as well as pneumatic or hydraulic motors, or even electric stepping motor systems in lieu of electric motors 10. Electric motor 10 preferably is a twelve volt DC automotive-style or permanent magnet motor having fractional horsepower.

Each rotary cutter blade 12 preferably has a length of ten inches and a thickness of 0.07 inches, and is formed of a lightweight 0.070 gauge serrated plastic such as the plastic sold under the trademark "LEXAN" by General Electric. Thus, it can be seen that such lightweight plastic blades enable use of the low power electric motors 10, and are safer to use since such blades cannot cause severe injury of the type possible with conventional metal cutter blades, although safety still should be practiced when mower 1 is operating. It is understood that other types of blades could be incorporated into mower 1 without affecting the concept of the invention, such as reel or cutter bar blades.

An electric dual motor drive is mounted on mower carriage 11 generally adjacent to each blade 12, and hereinafter the motors will be collectively referred to as 20 and individually as 20a, 20a', 20b, 20b', 20c, 20c', 20d, and 20d' (FIGS. 1 and 1a). A wheel is mounted on an output shaft 18 of each motor 20, and hereinafter the wheels will be collectively referred to as 21 and individually as 21a, 21a', 21b, 21b', 21c, 21c', 21d, and 21d', respectively.

Each dual motor 20 preferably is a dual drive gear reducer, magnetically clutched, six volt DC, 100 RPM, reversible motor of the type manufactured by H & R Corporation, of 401 East Erie Avenue, Philadelphia, Pa. 19134, and identified by Model No. TM 22K638. Motors 20 are reversible by reversing the DC input polarity to the motor. Other types of motors can replace electric motors 20, such as internal combustion engines having electric clutch systems, hydraulic or pneumatic motors, or even electrical linear-actuated steering arms. Each plastic wheel 21 preferably is of the type manufactured by H & R Corporation of Philadelphia, Pa., and identified by Model No. TM 22K677.

In accordance with one of the main features of the present invention, four limit alarm relays, hereinafter collectively referred to as 30 and individually as 30a, 30b, 30c and 30d, are electrically connected to electric blade motors 10a, 10b, 10c and 10d, respectively, at their input end, and to each motor 20 through their output end by electrical connectors 31a, 31a', 31b, 31b', 31c, 31c', 31d, and 31d', respectively (FIG. 1). More particularly, relay 30 includes a trip point corresponding to a predetermined level of power consumption of its respective motor 10, the operation of which will be described in detail below. Relay 30 is of the type manufactured by Action Instruments, Inc. of 8601 Aero Drive, San Diego, Calif. 92123, and identified as being part of Action's AP1000 Series of instruments.

It is understood that other types of power consumption detectors could be utilized without affecting the concept of the invention, including: tachometers measuring blade revolutions per minute, voltage measuring devices, Hall effect transducers, back electromagnetic motor field sensors, cutter blade strain gauge measuring devices, transistor-switched current sensing circuitry, and solid state power MOSFET current sensing circuits, such as those sold under the trademark "HEXFET" by International Rectifier of 233 Kansas St., El Sequndo, Calif. 90245. If internal combustion engines replace electric motors 10, the power consumption thereof could be detected by devices which sense changes in revolutions per minute, fuel metering, air metering, or vacuum manifold changes, by strain gauge metering, or by other similar devices wellknown in the automotive art. If pneumatic or hydraulic motors are used instead of the electric motors, their power consumption could be detected by devices which sense the amount of compressed air or fluid, respectively, being supplied to the motors. If electric stepping motor systems are used in lieu of electric motors 10, power consumption could be detected by a device which senses pulse width modulation. Also, if an alternating current motor system is used in place of motors 10, power consumption could be detected by a device which senses voltage or current phase change in the power factor.

Improved automatic self-guiding lawn mower 1 operates and is utilized in a method of mowing a lawn of the present invention in the following manner. Motors 10 are actuated and a border 40 (FIG. 2) generally equal to distance S shown in FIG. 1 is manually cut around an uncut area 45 of lawn to be mowed, which includes peripheral edges 41, 42, 43 and 44. During this manual cutting mode appropriate relays or switches (not shown) will be manually actuated by the operator to disconnect motors 20 from their driving engagement with wheels 21, rendering the wheels freewheeling. Thus the operator will manually mow border 40 by pushing the mower around the border with the grass being cut by powered driven blades 12 as occurs in a usual power driven mower. After border 40 is cut the operator will manually actuate the relays to reconnect drive motors 20 to wheels 21. Alternately, border 40 can be manually cut with a different mower eliminating the need for such motor disconnect relays or switches without affecting the concept of the invention. After cutting border 40, mower then is positioned adjacent to one of the peripheral edges 41-44 of the area of uncut grass 45, afterwhich the mower can be left unsupervised to operate automatically until the entire area 45 is cut.

The manner in which mower 1 self-guides itself along one of the peripheral edges 41-44 of an area of uncut grass 45 is illustrated sequentially in FIGS. 2-6. FIG. 2 shows a possible initial position of mower 1 encountering peripheral edge 41 of uncut grass area 45. The drive circuit for each dual motor 20 preferably includes a trimmer potentiometer 50 which provides for fine adjustment for the individual motors of each dual motor (FIG. 1). These potentiometers are well known in the industry. One example of which is manufactured by ETI Systems Inc. and identified as its Model No. MW46 and distributed by Allied Electronics of Chicago, Ill. By such fine adjustment, wheels 21d and 21c will rotate slightly faster than the other drive wheels moving mower 1 in a slightly arcuate path as shown by arrow I in FIG. 3, or in the alternative potentiometers 50 are adjusted to slow down the speed of drive motors 21a and 21b. As cutter blade 12a encounters the uncut grass of lawn area 45 and blades 12b, 12c and 12d encounter the pre-cut grass of border 40, the drag against blade 12a causes increased power consumption in motor 10a. When a predetermined level of power consumption of motor 10a is reached, for example 75% of its full power output, relay 30a is tripped and in turn actuates drive motors 20c, 20c', 20d and 20d' by distributing six volts of direct current to each of the motors. This differential drive feature of mower 1, that is, certain wheels 21 thereof being driven while others act as idler wheels, causes mower 1 to turn in the direction of arroW 1 of FIG. 2 toward the uncut grass.

As mower 1 continues turning into uncut grass area 45, cutter blade 12b also encounters uncut grass as shown in FIG. 3. When blades 12a and 12b both are encountering uncut grass, and blades 12c and 12d are encountering cut grass, relays 30a and 30b actuate drive motors 20b, 20b', 20c, 20c', 20d and 20d', thus causing mower 1 to steer further into uncut grass area 45 in the direction of arrow I of FIG. 3.

As mower 1 continues further into uncut grass area 45 following the curved path of arrow I, cutter blades 12a, 12b and 12c encounter uncut grass, while only blade 12d is encountering cut grass as shown in FIG. 4. The mower will stay in the curved path of arrow I until blade 12c reaches uncut grass which will send a signal to motor 20a' causing wheels 20a' and 20b' to speed up to a preset amount so that mower 1 begins to run in a straight path represented by arrow A in FIG. 4. Relays 30a, 30b and 30c distribute drive power to all motors 20 which causes the mower to run in a generally straight path along peripheral edge 41 of uncut grass area 45 in the direction of arrow A of FIG. 4. Fine adjustment is provided to all of the drive motors through trimmer potentiometers 50 to provide for such straight line operation.

Although the potential swath size which can be cut by mower 1 is distance S as shown in FIG. 1, the actual swath size cut will be distance T as shown in FIG. 1, with blade 12d preferably running partially through uncut grass to ensure overlap of mower blades 12 on cut and uncut areas of grass so that no uncut areas are missed. If all blades 12 of mower 1 encounter uncut grass as shown in FIG. 5, motors 20a, 20a', 20b, 20b', 20c and 20c', Will be actuated causing the mower to turn out of uncut grass in the direction of arrow 0 of FIG. 5, and reassume the position along peripheral edge 41 of uncut grass area 45 as illustrated in FIG. 4.

When mower 1 approaches the end of peripheral edge 41 of uncut grass area 45 and moves into pre-cut border 40 as shown in FIG. 6, blades 12 all encounter cut grass. A timer device built into relays 30, of a type which is well-known in the art, is activated and a one second delay is timed, afterwhich relays 30 reverse the polarity of motors 20 from the previous straight line path of direction A to a new curved path of direction B. The trimmer potentiometer automatically will move mower 1 in curved direction B by supplying a slightly greater amount of power to drive motors 20d and 20c causing wheels 21d' and 21c ' to rotate slightly faster. The mower continues in this curved direction B, in the same manner as described above and as shown in FIG. 3, with blade 12b, 12c and finally 12a encountering uncut grass. Upon blade 12a encountering the uncut grass cut peripheral edge 46, a signal is sent to the trimmer potentiometer of motors 20d and 20c causing these motors to slow down sufficiently for the mower to assume a straight line direction opposite to that of direction A as shown in FIG. 4. Upon mower 1 reaching cut border 40, the trimmer potentiometers are programmed so that the speed of the wheels again move mower 1 in the direction of arrow I as shown in FIG. 4, and the above-described cycle of movements of mower 1 are repeated in the opposite direction beginning with cutter blade 12a encountering new peripheral edge 50 of uncut grass area 45.

The spacing D between the outer edges of blade pairs 12a, 12d and 12b, 12c allows such a short time delay to be effectively used without risking confusion of the mower by a bare spot in the lawn, etc., which could otherwise cause unwanted reversal of the direction of the mower. If 2.3 seconds pass after reversal and blades 12 do not run into any uncut grass, relays 30 will automatically shut down motors 10 and 20 of mower 1. Thus, it can be seen that lawns of various shapes and sizes can be cut by mower 1 in a short period of time without human supervision, in daylight or darkness.

It is important to note that mower 1 lacks optical sensors such as those that are found in many prior art automatic self-guiding lawn mowers, which are vulnerable to malfunction due to blocking of the photosensors from cut grass and debris raised by the mower blades. In addition, optical sensors can be confused by thin spots in the uncut area of the lawn which could confuse the mower and cause it to run out of control.

It is understood that although four blades 12 is the preferred number of blades, a different number of blades could be incorporated into mower 1 without affecting the concept of the invention. However, the more cutter blades 12 incorporated into mower 1, the better control that will be achieved by mower 1 leaving less opportunity for confusion of the mower by bare spots in the grass, stepping stones, etc. The use and adjustment of the trimmer potentiometers enable the drive power of the mower wheels to be fine tuned whereby the mower will naturally move in an arcuate path into the uncut grass and then continue in a straight line following the cut border. It is further understood that eight wheels 21 driven by eight motors 20 is the preferred number for maximum traction and steering control of mower 1, although other numbers of wheels and motors could be used without affecting the concept of the invention. Also, a single twelve volt DC drive motor having a single or two wheel drive system could replace each adjacent pair of drive motors such as 20a and 20b.

A mower having a single blade attached to a motor which in turn is connected through a relay to a solenoid positioned drive/steering wheel, has been contemplated by the inventors of the present invention. The relay would have multiple power consumption sensing trip points which in turn would send signals to the motor solenoid for positioning the wheel to guide the mower.

It is further noted that the above-described preferred embodiment of mower 1 contemplates digital discrete control of motors 20 by relays 30, although more expensive analog proportional systems for enhancing control of the mower could be incorporated therein without affecting the concept of the invention.

Furthermore, if desired, the trimmer potentiometer could be adjusted so that the mower continuously moves in a circular path after initially manually cutting a circular border around the uncut grass area to be subsequently cut.

Also, it is further contemplated that the abovedescribed guidance system could be used in other applications such as farm harvesting.

Again, one of the important features of the present invention is the manner in which relays 30 detect the power consumption of associated cutter blade motors 10, which differs depending on whether attached blades 12 are encountering cut or uncut grass, for selectively distributing drive power to wheel motors 20 to guide the mower without the aid of optical sensors or the like which are subject to frequent malfunction.

In summary, the improved automatic self-guiding lawn mower and mowing method of the present invention provide for mowing a lawn under continuous control by avoiding problems of significant confusion or "fooling" of the mower logic by conditions such as bare spots in the lawn or grass clippings. The improved mower is capable of mowing a lawn of substantially any shape or size in a relatively short period of time, in daylight or darkness. The mower and method are safe, and the mower itself is relatively inexpensive to manufacture, and easy and economical to operate and maintain.

Accordingly the improved automatic self-guiding lawn mower and mowing method are simplified, provide an effective, safe, inexpensive, and efficient apparatus and method which achieve all the enumerated objectives, provide for eliminating difficulties encountered with prior apparatus and methods, and solve problems and obtain new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved automatic self-guiding lawn mower is constructed and used and the mowing method steps carried out, the characteristics of the construction, and the advantageous, new and useful results obtained; the new and useful structures, devices, elements, arrangements, parts, combinations, and method steps, are set forth in the appended claims.

We claim:

1. An automatic self-guiding lawn mower, including:
   (a) a carriage;
   (b) at least one first motor and at least one second motor mounted on the carriage;
   (c) blade means operatively connected to and driven by the first motor for cutting a lawn;
   (d) wheel means operatively connected to and driven by the second motor for moving the carriage in a predetermined path; and
   (e) sensor means connected to the first and second motors for detecting a predetermined change in the operation of the first motor when the blade means moves between a cut area and an uncut area of the lawn, and for causing a certain change in the second motor upon detection of the predetermined change in the first motor, so that the carriage is moved in said predetermined path through the uncut area of the lawn.

2. The lawn mower defined in claim 1 in which the first and second motors are electric motors.

3. The lawn mower defined in claim 2 in which the electric motors are low power motors; and in which a battery is mounted on the carriage for supplying power to the motors.

4. The lawn mower defined in claim 1 in which the first and second motors are hydraulic motors.

5. The lawn mower defined in claim 1 in which the first and second motors are pneumatic motors.

6. The lawn mower defined in claim 1 in which the first and second motors are internal combustion motors.

7. The lawn mower defined in claim 1 in which the sensor means is a relay device; in which the relay device includes at least one trip point; and in which the relay device is electrically connected to the first and second motors, for detecting a predetermined change in the power consumption of the first motor corresponding to the trip point when the blade means moves between a cut area and an uncut area of the lawn, and for actuating the second motor and attached wheel means in response thereto.

8. The lawn mower defined in claim 7 in which the relay device includes timer means for reversing the polarity of the second motor and direction of the lawn mower when the blade means encounters a cut area of the lawn for a first predetermined amount of time.

9. The lawn mower defined in claim 7 in which the relay device includes timer means for automatically shutting off the first and second motors when the blade means encounters a cut area of the lawn for a second predetermined amount of time.

10. The lawn mower defined in claim 1 in which at least a pair of the second motors are mounted in a spaced relationship on the carriage; and in which the direction of spacing of the second motors is generally perpendicular to the direction of movement of the carriage.

11. The lawn mower defined in claim 1 in which at least a pair of the first motors are mounted in a spaced relationship on the carriage; and in which the direction of spacing of the first motors is the same as the direction of movement of the carriage.

12. The lawn mower defined in claim 11 in which the blade means is an elongated plastic blade horizontally mounted on an output shaft of each of the first motors beneath the carriage; and in which a circumference of rotation of the blade of each of the first motors is spaced from the circumference of rotation of the blade of the other first motor in the direction of movement of the carriage.

13. A method of mowing a lawn with an automatic self-guiding lawn mower having at least first and second motor means for driving operatively connected blade means and wheel means, respectively, for cutting the lawn and moving the mower, including the steps of:
   (a) manually cutting a border around the lawn;
   (b) positioning the mower adjacent to a peripheral edge of an uncut area of the lawn;
   (c) actuating the first motor means for driving the operatively connected blade means;
   (d) actuating the second motor means for driving the operatively connected wheel means to move the mower in a curved path into the uncut area of the lawn;
   (e) sensing a predetermined change in the operation of the first motor means when the attached blade means moves to a certain position in an uncut area of the lawn; and
   (f) causing a certain change in the second motor means upon detection of the predetermined change in the first motor means when the mower means reaches said certain position in the uncut area so that the mower moves in a generally straight line along the peripheral edge of the uncut area of the lawn.

14. The method defined in claim 13 including the step of sensing a predetermined change in the power consumption of the first motor means when the blade means moves between a cut area and an uncut area of the lawn, and actuating the second motor means and attached wheel means in response thereto.

15. The method defined in claim 13 including the step of reversing the polarity of the second motor means and direction of the lawn mower when the blade means encounters a cut area of the lawn for a first predetermined amount of time.

16. The method defined in claim 13 including the step of automatically shutting off the first and second motor means when the blade means encounters a cut area of the lawn for a second predetermined amount of time.

* * * * *